US012485280B1

(12) United States Patent
Cranko et al.

(10) Patent No.: US 12,485,280 B1
(45) Date of Patent: Dec. 2, 2025

(54) UNITARY ENHANCED JET SPRAY DERMAL TREATMENT HANDPIECE

(71) Applicant: Tav-Tech Ltd, Yehud (IL)

(72) Inventors: Tim Cranko, Ganei Tikva (IL); Natalya Shtein, Katsrin (IL); Shai Betelman, Katsrin (IL); Amit Barak, Tel Aviv (IL); Hagai Barak, Tel Aviv (IL); Rona Levin, Shoham (IL)

( * ) Notice: Subject to any disclaimer, the term of this patent is extended or adjusted under 35 U.S.C. 154(b) by 0 days.

(21) Appl. No.: 18/778,991

(22) Filed: Jul. 21, 2024

Related U.S. Application Data

(60) Provisional application No. 63/671,285, filed on Jul. 15, 2024.

(51) Int. Cl.
*A61N 1/32* (2006.01)
*A61M 37/00* (2006.01)
*A61N 1/04* (2006.01)

(52) U.S. Cl.
CPC ......... *A61N 1/327* (2013.01); *A61M 37/0092* (2013.01); *A61N 1/0412* (2013.01);
(Continued)

(58) Field of Classification Search
CPC ........ A61M 37/0092; A61M 2205/055; A61M 2037/0007; A61N 1/0412; A61N 1/327
See application file for complete search history.

(56) References Cited

U.S. PATENT DOCUMENTS 5,279,543 A * 1/1994 Glikfeld ............... A61B 5/411
604/20
6,041,253 A * 3/2000 Kost .................. A61B 5/14514
604/20
(Continued)

FOREIGN PATENT DOCUMENTS

CN 114042239 2/2022
CN 114225246 3/2022
(Continued)

OTHER PUBLICATIONS

Malyško-Ptašinskė et al., "Invasive and non-invasive electrodes for successful drug and gene delivery in electroporation-based treatments", Frontiers in Bioengineering and Biotechnology, Published Jan. 16, 2023 (Jan. 16, 2023), pp. 1-18.

*Primary Examiner* — Laura A Bouchelle
*Assistant Examiner* — Adam J. Cermak
(74) *Attorney, Agent, or Firm* — JMB DAVIS BEN-DAVID

(57) ABSTRACT

A multi-technology dermal treatment unitary handpiece includes a jet spray delivery handpiece having an elongate housing terminating in one or more nozzles for directing along an axis a therapeutic spray towards the skin of a subject at a desired spray application distance therefrom; and one or more symbiotic treatment handpiece elements terminating in an operative end member having a dermal touch surface for conveying a treatment to the skin, the treatment being symbiotic with therapy provided by the therapeutic spray, wherein the operative end member and the touch surface are laterally spaced apart from the axis, and wherein the operative end member and the touch surface are axially displaced from the one or more nozzles by a distance determined to limit the proximity of the one or more nozzles to the skin of a subject to no less than the desired spray application distance.

12 Claims, 13 Drawing Sheets

(52) U.S. Cl.
CPC ............. *A61M 2037/0007* (2013.01); *A61M 2202/0007* (2013.01); *A61M 2202/04* (2013.01); *A61M 2205/054* (2013.01); *A61M 2210/04* (2013.01)

(56) References Cited

U.S. PATENT DOCUMENTS

| | | | | |
|---|---|---|---|---|
| 6,283,936 | B1 * | 9/2001 | Tavger | A61B 90/80 |
| | | | | 604/35 |
| 6,520,950 | B1 * | 2/2003 | Hofmann | A61N 1/0412 |
| | | | | 604/503 |
| 6,673,081 | B1 * | 1/2004 | Tavger | A61B 17/545 |
| | | | | 604/289 |
| 6,692,456 | B1 * | 2/2004 | Eppstein | A61M 37/0015 |
| | | | | 607/2 |
| 7,758,561 | B2 | 7/2010 | Eppstein | |
| 7,901,373 | B2 * | 3/2011 | Tavger | A61C 17/0208 |
| | | | | 604/24 |
| 8,133,216 | B2 | 3/2012 | Knopp | |
| 9,044,582 | B2 * | 6/2015 | Chang | A61M 37/00 |
| 9,186,490 | B2 | 11/2015 | Chang | |
| 9,283,029 | B2 | 3/2016 | Britva | |
| 9,572,527 | B2 | 2/2017 | Chuang | |
| 9,782,334 | B2 | 10/2017 | Serrano Sanmiguel | |
| 11,291,836 | B2 | 4/2022 | Broderick | |
| 11,571,568 | B2 * | 2/2023 | Bezalel | A61N 1/328 |
| 11,806,495 | B2 * | 11/2023 | Ignon | A45D 34/041 |
| 2003/0073238 | A1 * | 4/2003 | Dzekunov | A61K 9/5068 |
| | | | | 435/173.6 |
| 2006/0036210 | A1 * | 2/2006 | Zhang | A61N 1/327 |
| | | | | 604/20 |
| 2008/0319453 | A1 * | 12/2008 | Tavger | A61C 17/0217 |
| | | | | 606/131 |
| 2009/0030364 | A1 * | 1/2009 | Harmon | A61N 1/327 |
| | | | | 604/20 |
| 2009/0043293 | A1 * | 2/2009 | Pankratov | A61N 1/328 |
| | | | | 601/4 |
| 2009/0234269 | A1 * | 9/2009 | Tavger | A61M 11/02 |
| | | | | 604/20 |
| 2010/0121259 | A1 * | 5/2010 | Lutski | A61N 7/00 |
| | | | | 604/290 |
| 2010/0130972 | A1 * | 5/2010 | Yambor | A61B 18/14 |
| | | | | 607/2 |
| 2013/0345661 | A1 * | 12/2013 | Chang | A61B 17/3207 |
| | | | | 604/20 |
| 2014/0378887 | A1 * | 12/2014 | Chang | A61M 37/00 |
| | | | | 604/289 |
| 2015/0065944 | A1 * | 3/2015 | Ohri | A61N 5/045 |
| | | | | 604/21 |
| 2016/0310728 | A1 * | 10/2016 | Cazares Delgadillo | A61N 1/0428 |
| 2017/0225010 | A1 * | 8/2017 | Tankovich | A61M 37/0092 |
| 2018/0311487 | A1 * | 11/2018 | Cowe | A61M 37/0092 |
| 2019/0000489 | A1 * | 1/2019 | McCoy | A61M 5/24 |
| 2019/0083306 | A1 * | 3/2019 | Suen | A61F 9/0008 |
| 2020/0384253 | A1 * | 12/2020 | Fia | A61M 35/003 |
| 2020/0406016 | A1 | 12/2020 | Kalghatgi | |
| 2021/0275747 | A1 * | 9/2021 | Sobel | A61M 5/24 |
| 2021/0275834 | A1 * | 9/2021 | Duchon | A61M 37/0092 |
| 2021/0299420 | A1 * | 9/2021 | Sobel | A61M 5/3007 |
| 2021/0387237 | A1 * | 12/2021 | Leighton | B05B 1/083 |
| 2023/0067329 | A1 * | 3/2023 | Cranko | A61M 25/0068 |

FOREIGN PATENT DOCUMENTS

| | | | | |
|---|---|---|---|---|
| EP | 1883447 | B1 * | 9/2009 | ............. A61M 5/30 |
| GB | 2410191 | | 7/2005 | |
| KR | 101631288 | B1 * | 6/2016 | ........... A61M 37/00 |
| WO | 2005065032 | | 7/2005 | |
| WO | WO-2005065032 | A2 * | 7/2005 | ........ A61C 17/0208 |

* cited by examiner

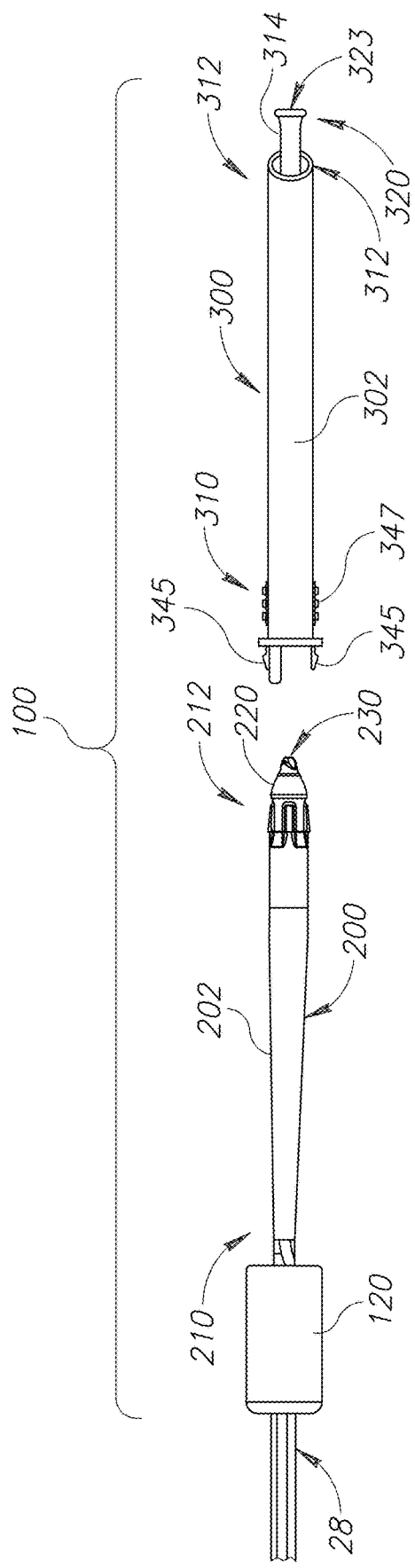
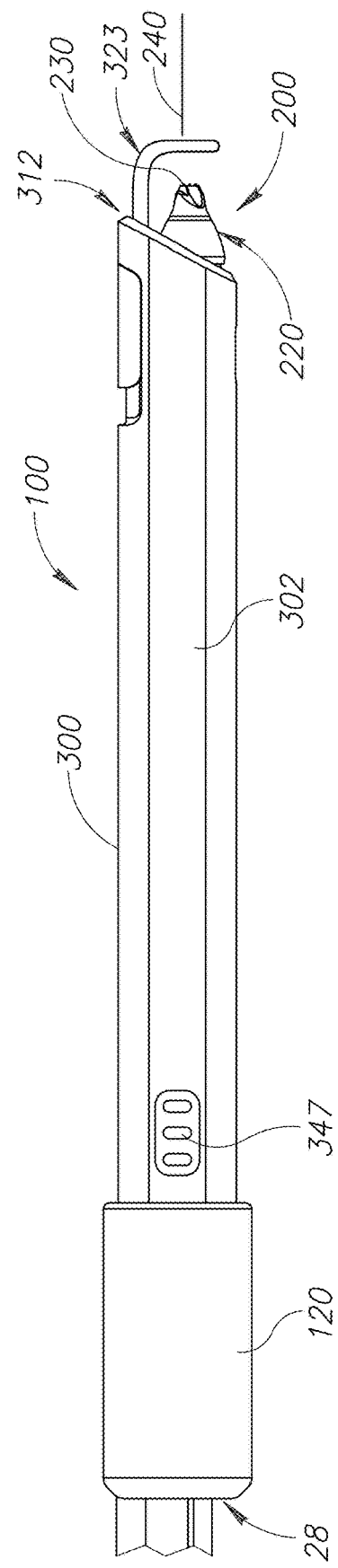
FIG.2
FIG.3A

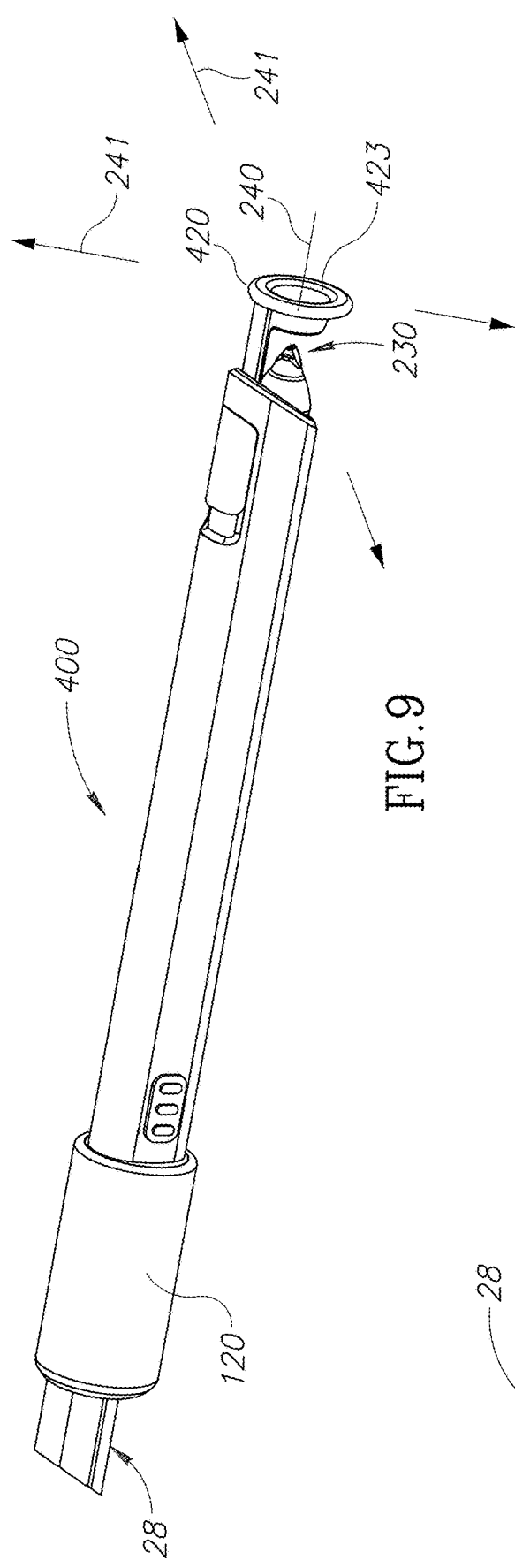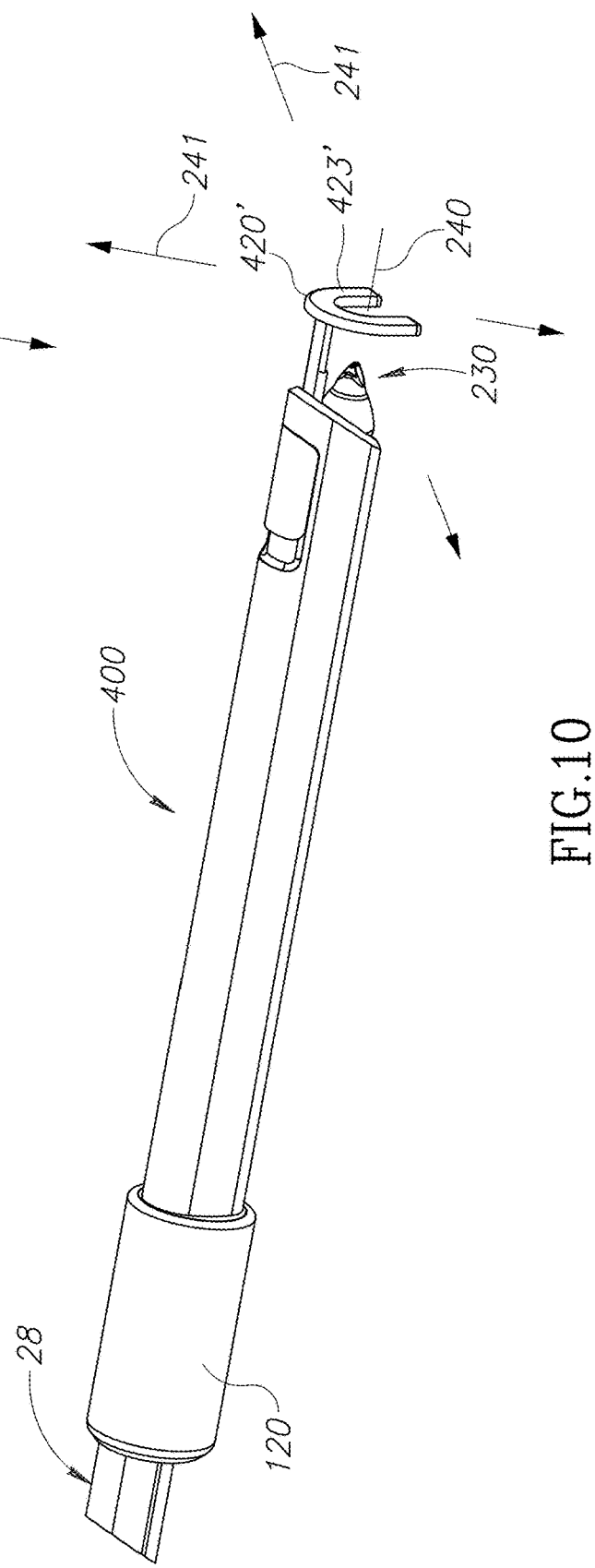

UNITARY ENHANCED JET SPRAY DERMAL TREATMENT HANDPIECE

CROSS-REFERENCE TO RELATED APPLICATIONS

Benefit is claimed to U.S. Provisional Patent Application No. 63/671,285, filed Jul. 15, 2024, the contents of which are incorporated by reference herein in their entirety.

FIELD OF INVENTION

The present disclosure generally relates to handheld devices for dermal administration of therapeutic agents.

BACKGROUND

Various technologies for therapeutic treatment of the skin of a human subject are well known in the art. One such skincare technology is described in the present applicant's International Publication No. WO 2005/065032, "A High Velocity Liquid-Gas Mist Tissue Abrasion Device", the contents of which are incorporated herein by reference.

Disclosed in the above referenced document is a dermal abrasion device which a high-velocity liquid-gas jet spray formed of droplets of a therapeutic agent in liquid suspension. The spray applied to the skin of a subject as a streaming mist, and is useful for the transdermal delivery of therapeutic agents thereto.

Various additional technologies are known for their beneficial effects in the field of skincare.

Electroporation, for example, uses electrical pulses so as to increase cell permeability and to help deep penetration of skincare products. A detailed discussion of electroporation may be found in the article *Front. Bioeng. Biotechnol.*, 16 Jan. 2023, *Sec. Cell and Gene Therapy, Volume* 10-2022. An electroporation device for dermal therapy is also disclosed in U.S. Pat. No. 11,291,836 to Broderick et al.

Ultrasound therapy, known also as phonophoresis and sonophoresis, is well known for assisting with the administration of therapeutic agents transdermal, for example, at https://en.wikipedia.org/wiki/Phonophoresis.

SUMMARY

The present invention aims to provide an enhanced jet spray dermal delivery handpiece.

There is thus provided in accordance with an embodiment, a multi-technology dermal treatment unitary handpiece which includes:

- a jet spray delivery handpiece having an elongate housing terminating in one or more nozzles for directing along an axis a therapeutic spray towards the skin of a subject at a desired spray application distance therefrom; and
- one or more symbiotic treatment handpiece elements terminating in an operative end member having a dermal touch surface for conveying a treatment to the skin, the treatment being symbiotic with therapy provided by the therapeutic spray,
- wherein the operative end member and the touch surface are laterally spaced apart from the axis,
- and wherein the operative end member and the touch surface are axially displaced from the one or more nozzles by a distance determined to limit the proximity of the one or more nozzles to the skin of a subject to no less than the desired spray application distance.

Additionally in accordance with an embodiment, the operative ends of the one or more symbiotic treatment handpiece elements are adjustable along the axis with respect to the one or more nozzles, thereby to correspondingly adjust the spray application distance.

Further in accordance with an embodiment, the one or more symbiotic treatment handpiece elements includes first and second symbiotic treatment handpiece elements.

Additionally in accordance with an embodiment the operative end member and the dermal touch surface are curved and are mounted so as to reside within a plane transverse to the axis.

Further in accordance with an embodiment, the dermal touch surface is arc-shaped and is mounted such that its center of curvature intersects with the axis in a plane normal to the axis.

Additionally in accordance with an embodiment the one or more symbiotic treatment handpiece elements also include:

- a cylindrical sheath having proximal and distal ends, configured to fit at least partially around the housing of the jet spray delivery handpiece such that the one or more nozzles thereof protrude through the distal end of the cylindrical sheath; and
- a support for mounting the operative end member onto the distal end of the cylindrical sheath so as to position the touch surface from the one or more nozzles at a distance equal to the desired spray application distance.

Further in accordance with an embodiment, the housing of the jet spray delivery handpiece has proximal and distal ends, wherein the jet spray delivery handpiece also includes a jet spray delivery head formed at the distal end of the housing, terminating in the one or more nozzles, the delivery head being connected to a source of a liquid suspension of a therapeutic agent and to a source of a pressurized gas for a selectable combined supply of the liquid suspension and of the pressurized gas to the jet spray delivery head.

Additionally in accordance with an embodiment the operative end member is powered by electricity, and the one or more symbiotic treatment handpiece elements include an electrical conduction element for supplying electricity from an electrical source to the operative end member.

Further in accordance with an embodiment, the jet spray delivery handpiece includes a liquid supply tube positioned within the housing for supplying the liquid suspension of a therapeutic agent, wherein the housing is operable to convey pressurized gas to the delivery head so as to combine thereat into a jet spray the liquid and the pressurized gas, for delivery via the one or more nozzles;

- and wherein the cylindrical sheath has mounted in association therewith an electrical conductor for powering the operative end member.

Additionally in accordance with an embodiment, the liquid supply tube terminates at a proximal end at a liquid connector to an external liquid source, the sealed housing terminates at a proximal end at a gas connector to an external pressurized gas source, and the electrical conductor terminates at a proximal end at an electrical connector to an external source of electricity;

- and the handpiece also includes a hollow coupling connected to the proximal end of the cylindrical sheath, for housing the liquid, gas and electrical connectors.

Further in accordance with an embodiment, the coupling and the cylindrical sheath are coupled together by clips.

Additionally in accordance with an embodiment, the one or more symbiotic treatment handpiece elements is an electroporation element, and the operative end member is an electroporation probe.

Further in accordance with an embodiment, the one or more symbiotic treatment handpiece elements is an ultrasound element, and the operative end member is an ultrasound transducer.

Additionally in accordance with an embodiment, the first symbiotic treatment handpiece element is an electroporation element and the operative end member thereof is an electroporation probe; and the second symbiotic treatment handpiece element is an ultrasound element and the operative end member thereof is an ultrasound transducer.

Alternatively, there is provided a dermal treatment handpiece which includes:
- a jet spray delivery handpiece having an elongate housing terminating in one or more nozzles for directing along an axis a therapeutic spray towards the skin of a subject at a desired spray application distance therefrom; and
- an adjustable rigid spacer element mounted onto the housing, for adjustable limiting the proximity of the one or more nozzles to the skin of a subject during treatment to a selected spray application distance, the spacer element including:
- a curved dermal touch portion extending axially beyond the one or more nozzles so as to overhang the delivery head, configured to be held against the skin of a subject during treatment; and
- a mounting portion configured for mounting the dermal touch portion onto the housing at a known distance from the one or more nozzles, thereby determining the spray application distance.

Definitions

In the disclosure hereinbelow, the term "distal" refers to portions of the disclosed device or handpiece furthest from a user operating the device, that is, closest to a jet spray delivery end of the device. The term "proximal" refers to portions of the device or handpiece closest or most proximate to the user that is, the portion furthest from the jet spray delivery end of the device.

The term "operating media" is used as a collective term to include flows of air, liquid and electricity which are required for the operation of the unitary handpiece of the present disclosure.

BRIEF DESCRIPTION OF THE DRAWINGS

The present invention will be more fully understood and appreciated from the detailed description taken in conjunction with the drawings in which:

FIG. 2 is an exploded view of the handpiece of FIGS. 1A and 1B, according to an embodiment, prior to assembly;

FIGS. 3A and 3B are views of the handpiece of FIG. 2, after assembly;

FIG. 9 is a perspective view of a unitary handpiece similar to that of FIGS. 1A-8B, but wherein the illustrated operative end member is exemplified as a ring-shaped ultrasound transducer;

FIG. 10 is similar to FIG. 9, but wherein the transducer is U-shaped;

DETAILED DESCRIPTION

Figure 1A:
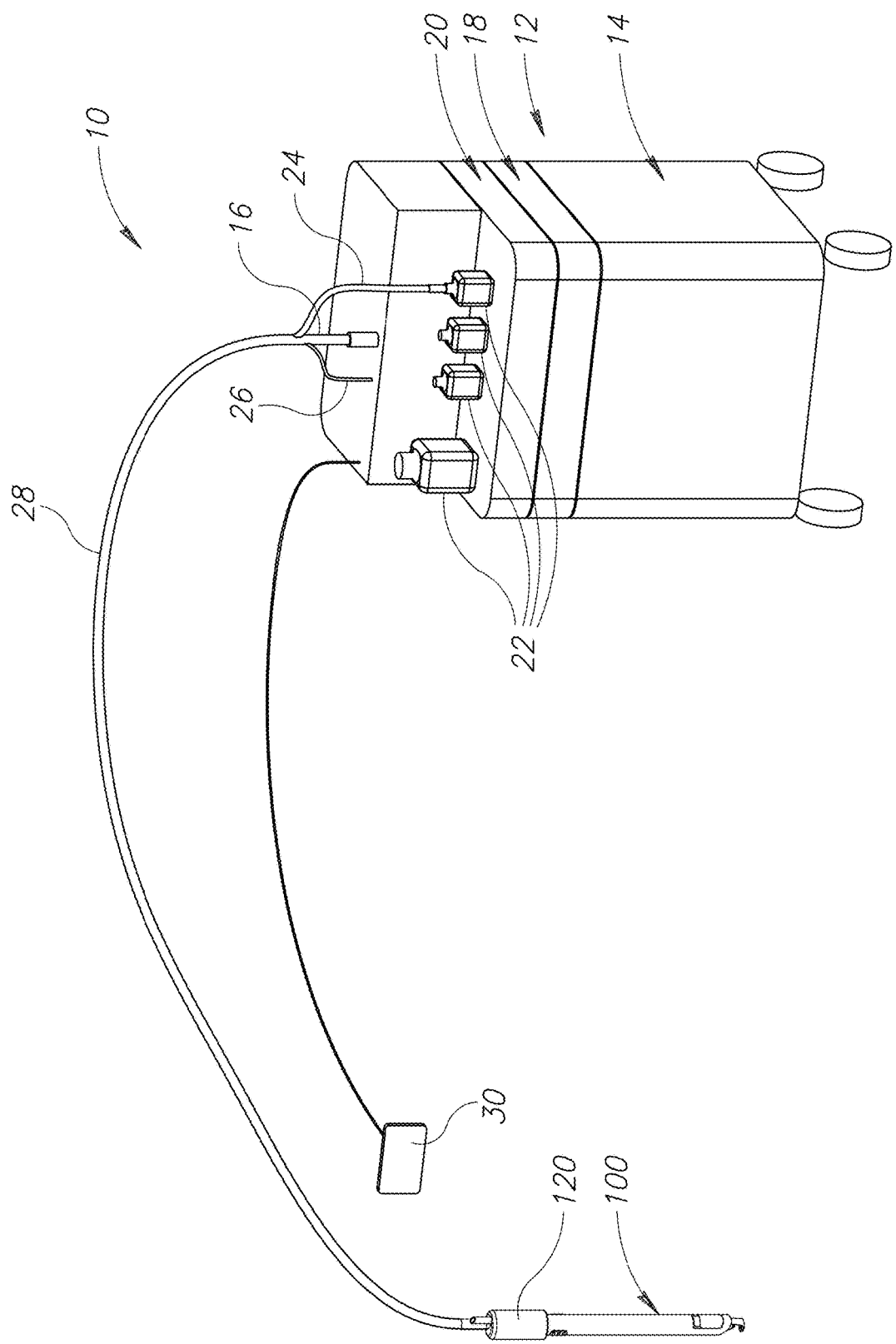
FIG. 1A is a dermal treatment system including a multi-technology dermal treatment unitary handpiece constructed and operative in accordance with an embodiment of the invention.

Referring now to FIG. 1A, the present invention relates to a multi-technology dermal treatment system 10 for enhancing the delivery of therapeutic substances to the dermis of a subject. System 10 employs one or more complementary dermal treatment systems, in symbiotic combination with a dermal jet spray treatment system, such as manufactured and marketed by the current applicant, Tav-Tech Ltd. of Yehud, Israel, and as available at https://jetpeel.com, for the treatment of a subject by use of a multi-technology dermal treatment unitary handpiece 100. Incorporation of one or more technologies into a unitary handpiece together with the herein described jet spray technology improves the porosity of the epidermis so as to enhance the jet spray treatment in a manner hitherto unavailable. As exemplified hereinbelow, such symbiotic or complementary systems may use electroporation and/or ultrasound technology, although additional technologies may be used either alternatively or in addition to these.

Referring now to FIGS. 1B-4, handpiece 100 incorporates, as mentioned, a jet spray delivery handpiece 200 and a symbiotic treatment element 300, incorporated into a single, handheld, dermal treatment tool. Treatment element 300 extends generally along and wraps around jet spray delivery handpiece 200 and terminates in an operative end member 320, seen to be generally coaxial with and protruding beyond nozzles 230 of handpiece 200 such that, in use, it essentially defines and isolates an area of treatment on the subject. In the presently illustrated embodiment, element 300 is an electroporation element, although other types of treatment technology that are symbiotic with respect to the jet spray treatment provided by handpiece 200, are also envisaged. Thus, by way of non-limiting example only, an alternative or additional symbiotic technology is ultrasound, as shown and described hereinbelow in conjunction with FIGS. 9-12B.

Also, as seen in the drawings, end member 320 and dermal touch surface 323 are curved, and reside within a plane schematically shown at 241 (FIGS. 1B and 3B) transverse to axis 240, typically normal thereto.

With specific reference now to FIG. 1A, system 10 has an operating system 12 which may be generally similar to any of the operating units such as provided with the Applicant's JetPro™, JetProDuo™, JetProToGo™ or MyJet™ products. Operating system 12 includes sources of the various operating media required for operation of the unitary handpiece of the present invention, and thus includes an air compressor 14 for providing compressed air to jet spray delivery handpiece 200 via an air tube 16; a cooling unit 18, and an electrical power supply unit 20.

Electrical power supply unit 20 incorporates the necessary hardware and software required to run the operative end member 320, whether this is embodied as (i) electroporation probe 320 as shown and described hereinbelow in conjunction with FIGS. 1B-8B; (ii) ultrasound transducer 420 and 420' as shown and described hereinbelow in conjunction with FIGS. 9 and 10 respectively; (iii) a combination of probe 320 and transducer 420, shown and described hereinbelow in conjunction with FIGS. 11-12B as combination member 520; or (iv) any other technologies symbiotic with the herein described jet spray technology. Such hardware and software as may be required to operate electroporation probes, on the one hand, and ultrasound therapy or phonophoresis transducers on the other hand, are well known in the art, and are thus not described herein in detail.

One or more therapeutic liquids, such as those advertised under the JetCare by TavTech™ brand at https://jetpeel.com/jetcare/, may be provided from various liquid containers 22 via liquid tubing 24. There is also provided an electric wire 26 for conducting electricity from the power supply 20 to the additional symbiotic sub-system incorporated in handpiece 100, as required. Air tube 16, liquid tubing 24 and wire 26 are all encased in a protective, molded umbilical cord 28, which connects to handpiece 100 via a coupling 120. A control panel is also provided, schematically exemplified in the drawing, referenced 30.

Referring now to FIG. 2 which illustrates handpiece 100 prior to assembly, jet spray delivery handpiece 200 has an elongate housing 202 having proximal and distal ends, respectively referenced 210 and 212. Distal end 212 has formed thereat a delivery head 220 having one or more nozzles 230. Jet spray delivery handpiece 200 may be as described in detail in applicant's European Patent No. 1883447, the contents of which are incorporated herein by reference; as described on the applicants https://tav-tech.com/jet-technology; or as per any suitable product available from Tav-Tech Ltd employing their liquid mist/jet spray technology. Accordingly, the precise inner construction and operation of handpiece so as to obtain the referenced jet spray is well known in the art and is thus not shown and described herein.

Figure 1B:
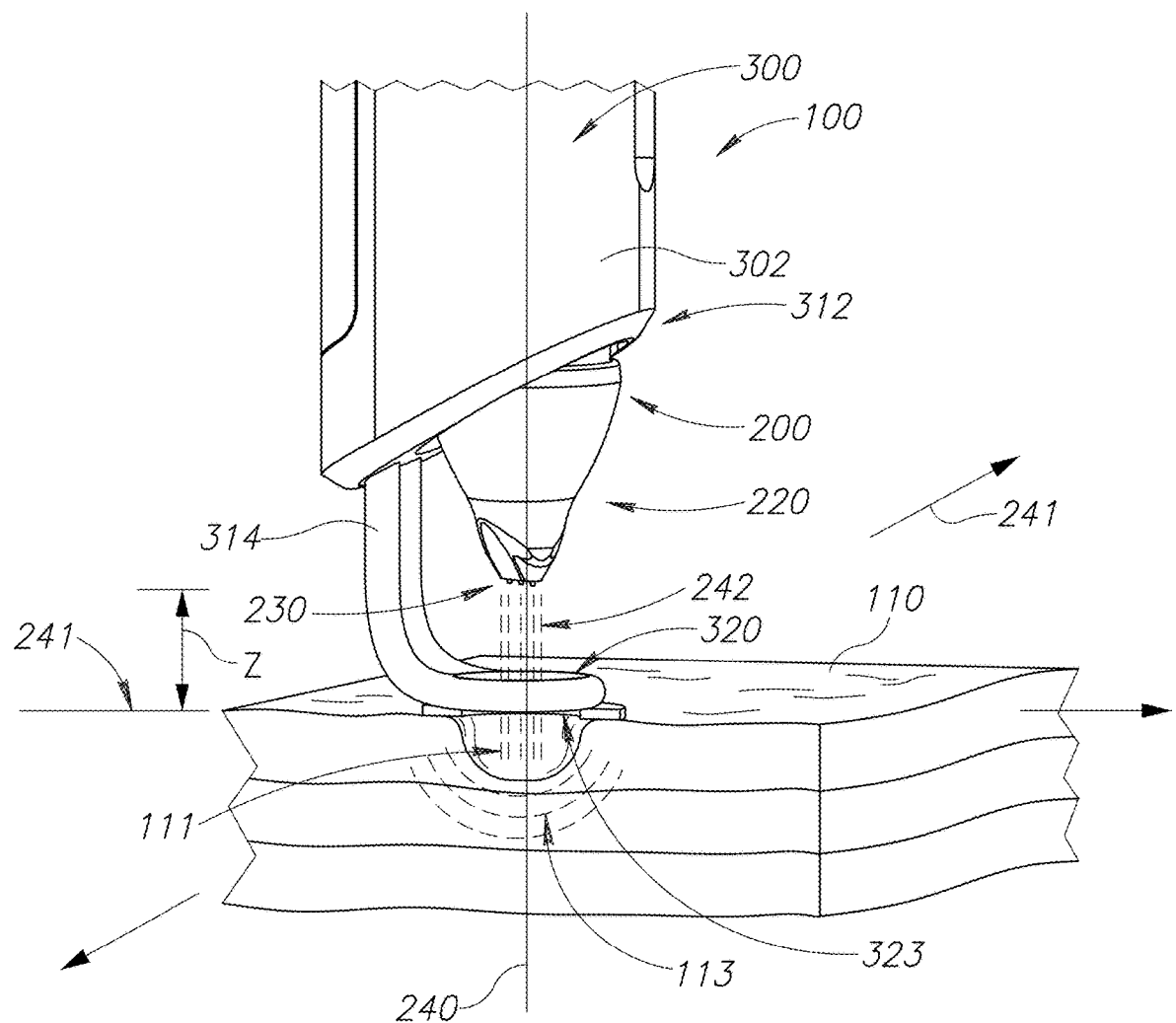
FIG. 1B is an enlarged schematic representation showing operation of the multi-technology dermal treatment unitary handpiece seen in FIG. 1A, wherein the illustrated operative end member is exemplified as an electroporation probe.

Nozzles 230 are operative to emit a therapeutic spray 242, as seen in FIG. 1B, towards the skin 110 of a subject. The spray is directed along an axis 240 at a predetermined spray application distance 'z' therefrom, typically in the range 5-15 mm. Axis 240 is typically the longitudinal axis of both jet spray delivery handpiece 200 and symbiotic treatment handpiece element 300.

The therapeutic spray is produced, as well known in the art, by combining inflows of a liquid suspension of a therapeutic agent provided from a liquid source such as containers 22 (FIG. 1A), and a pressurized gas as may be provided by compressor 14 (FIG. 1A), operated by a suitable control 30. This method of producing a high pressure, high velocity jet spray is well known in the prior art, inter alia, in the above-referenced PCT publication no. WO 2005/065032 and European Patent No. 1883447 of the applicant, in which gas is supplied from a pressurized gas source at a pressure in the range of 40-150 psi and liquid is supplied from a pressurized liquid source at a pressure in the range of 0 to 5 psi, which results in a discharge of a liquid into a high velocity gas stream so as to form an accelerated mist or spray of the liquid. It will be appreciated by persons skilled in the art that, as the pressurized discharging gas emerges from gas discharge nozzle into the atmosphere, it undergoes a rapid drop in pressure to atmospheric pressure. The sudden pressure drop results in a substantial acceleration of the velocity of the discharging gas flow that approximates or even exceeds the velocity of sound and the production of a shock wave. The effect of the shock wave is to atomize the liquid discharging from liquid discharge nozzle into the flow of gas as a mist of liquid droplets, such that there is obtained a relatively narrow jet of liquid droplets in a high velocity gas flow.

As seen in FIG. 2, symbiotic treatment handpiece element 300 is composed of a cylindrical sheath 302 having proximal and distal ends, referenced 310 and 312, respectively. An operative end member 320, exemplified herein as an electroporation probe, formed of any suitable electrically conductive material, is mounted onto distal end 312 by means of a support arm 314.

As seen also in FIGS. 2-4 and 7A-8B, sheath-like cylindrical sheath 302 is configured to fit over jet spray delivery handpiece 200 such that nozzles 230 protrude through distal end 312 of cylindrical sheath 302.

When jet spray handpiece 200 and symbiotic treatment handpiece element 300 are assembled, nozzles 230 and opening 321 of operative end member 320 are seen to be generally coaxial. Also as seen, operative end member 320 is seen to extend beyond nozzles 230 so as to be distally displaced therefrom along axis 240 and thus closer to the skin 110 during treatment, such that touch surface 323 touches the skin while nozzles 230 are spaced therefrom. As described, sheath 302 is formed to partially wrap around jet spray housing 202 so as to constitute a unitary handpiece adapted to be held in and operated by a single hand of a user. Furthermore, the respective proximal ends 210 and 310 of housing 202 and sheath 302 are fastened together by a hollow coupling 120, shown and described hereinbelow in greater detail in conjunction with FIGS. 5A-6.

Figure 5A:
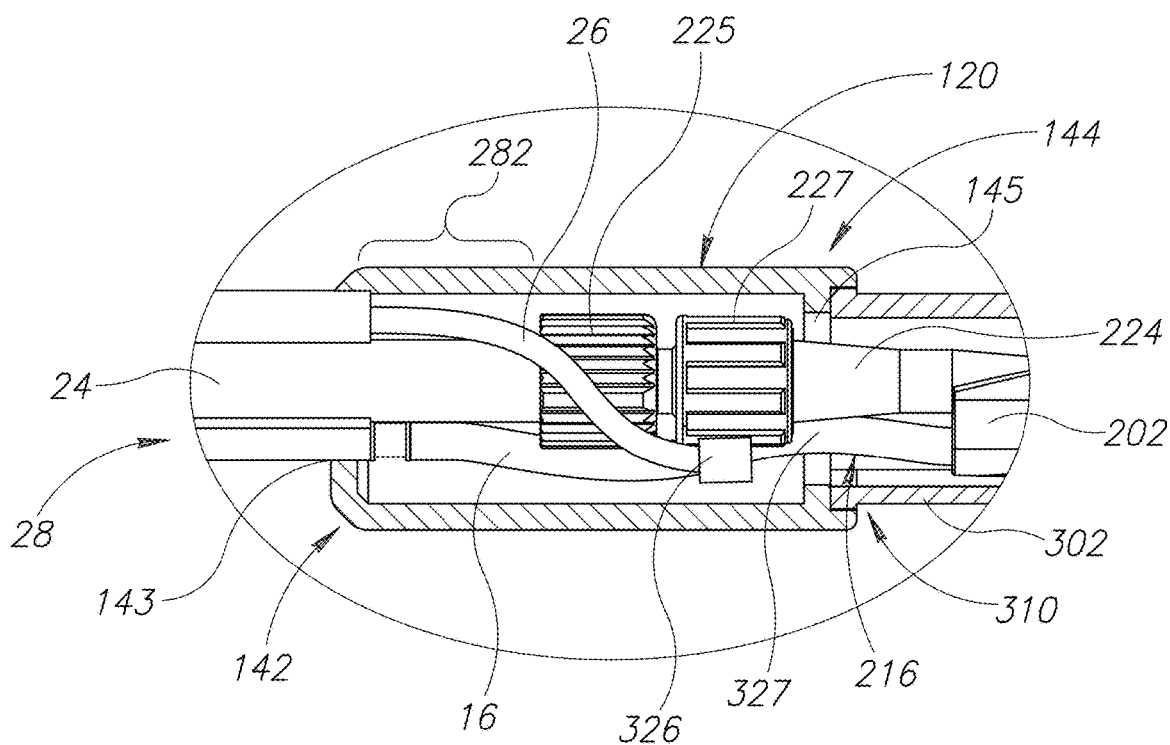
FIG. 5A is an enlarged partially cut-away side view of the coupling as illustrated in FIG. 4.
Figure 5B:
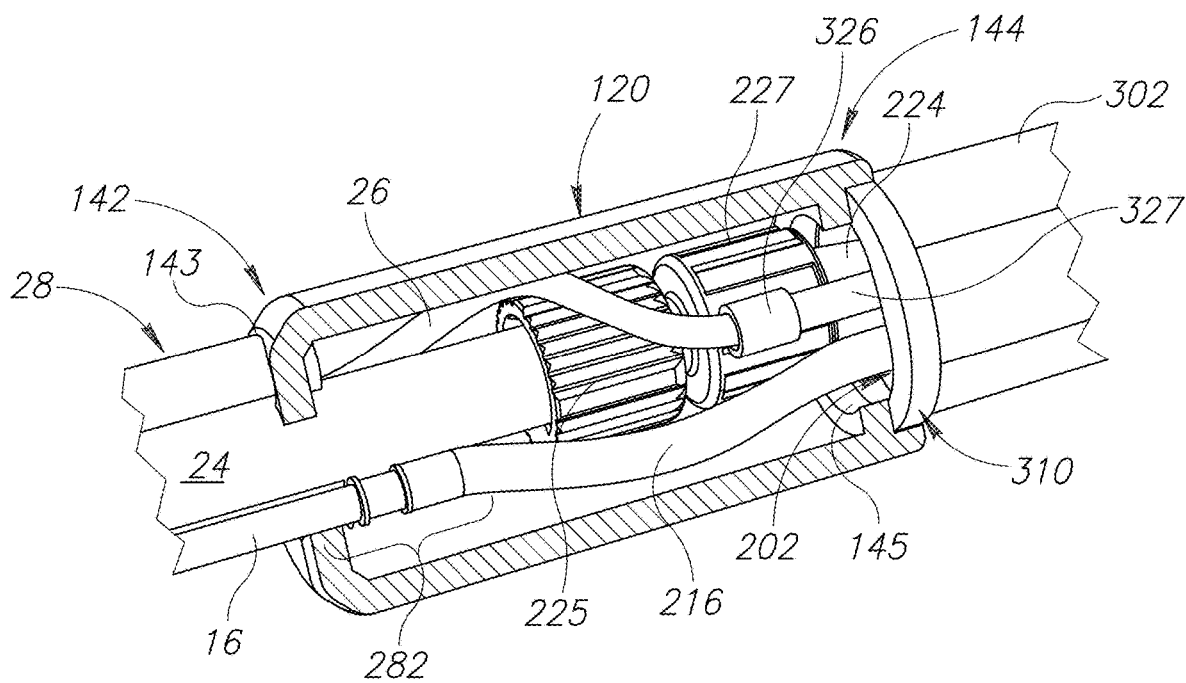
FIG. 5B is a perspective view of the coupling as depicted in FIG. 5A.
Figure 6:
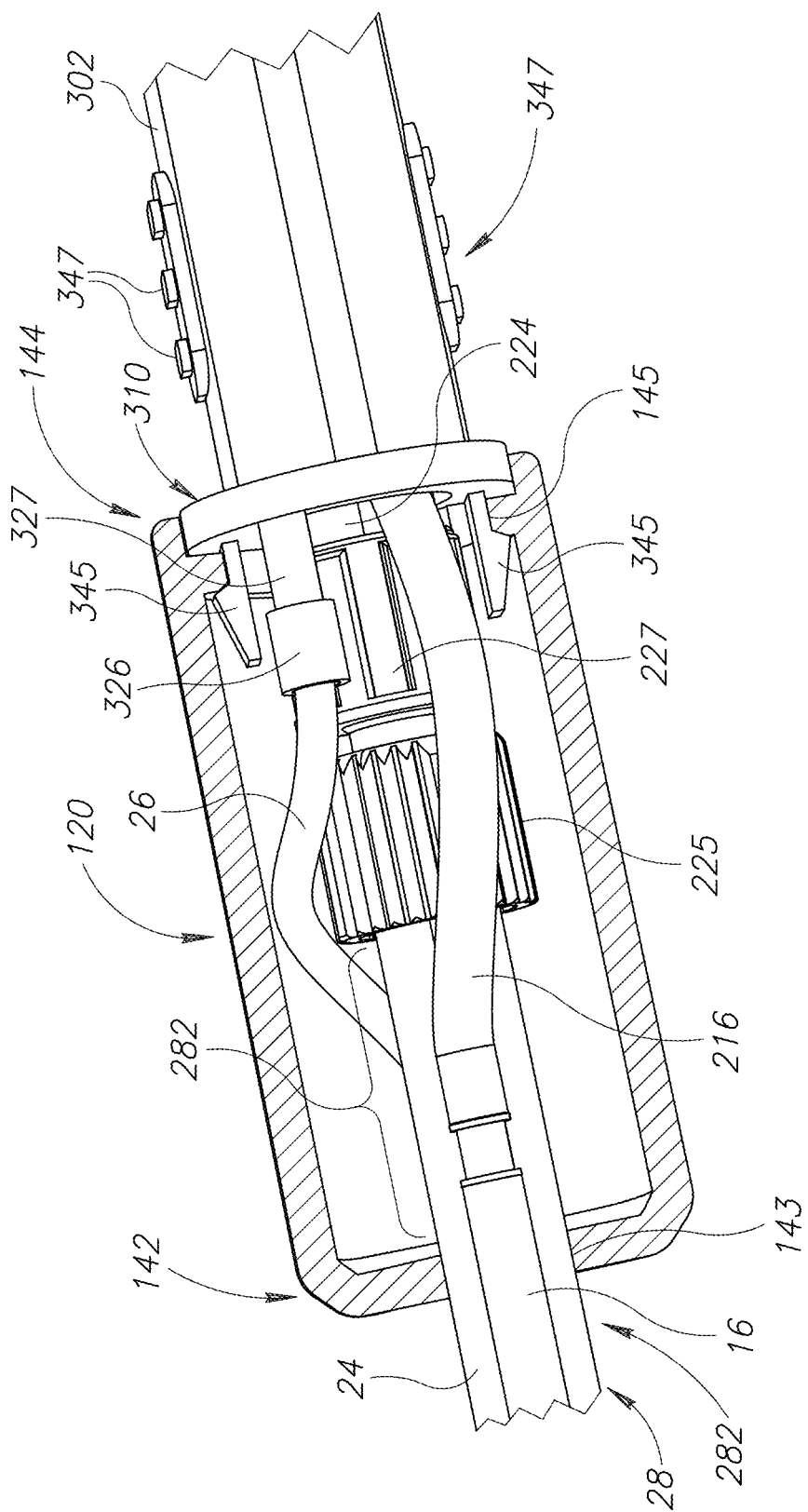
FIG. 6 is a view similar to those of FIGS. 5A and 5B, but having a snap coupling.

Referring now to FIGS. 5A-6, coupling 120 has a proximal end 142 and a distal end 144. Proximal end 142 has a proximal opening 143 through which passes umbilical cord 28 so as to facilitate provision of the operating media to the component handpieces 200 and 300, respectively. Distal end 144 has an opening 145 and is configured to connect with the proximal end 310 of sheath 302 of symbiotic treatment element 300. Coupling 120 and sheath 302 may be connected, for example, by gluing or welding, such as seen in FIGS. 5A and 5B. Alternatively, as illustrated in FIGS. 2 and 6, coupling 120 and sheath 302 may be connected via clips 345, so as to facilitate a snap connection therebetween. In accordance with yet a further embodiment, clips 345 may be configured so as to be depressible in an inward direction, as by push buttons illustrated schematically as 347, thereby to facilitate detachment of coupling 120 from sheath 302, if required, for maintenance purposes. As mentioned, that the connection of coupling 120 and sheath 302, which is a simple mechanical connection between two polymeric members, may be achieved in any suitable manner known in the art, such as by gluing, and is thus not described further herein, in detail.

Umbilical cord 28 has a distal end 282 which is mounted just within the interior of coupling 120. Each of the air tube 16, liquid tube 24, and electric wire 26 emerge from distal end 282 of cord 28, so as to provide the operating media to corresponding portions of the unitary handpiece 100, whereby air tube 16 is connected to a corresponding air intake tube 216 which extends inwardly into the jet spray housing 202; liquid tube 24, carrying a solution of water and a selected therapeutic substance, is connected to a corresponding liquid intake conduit 224 via suitable connectors 225 and 227; and electric wire 26 is connected, via a suitable pin connector 326, to an appropriately positioning electrical conductor 327 for conducting electrical charge to end member 320.

Figure 4:
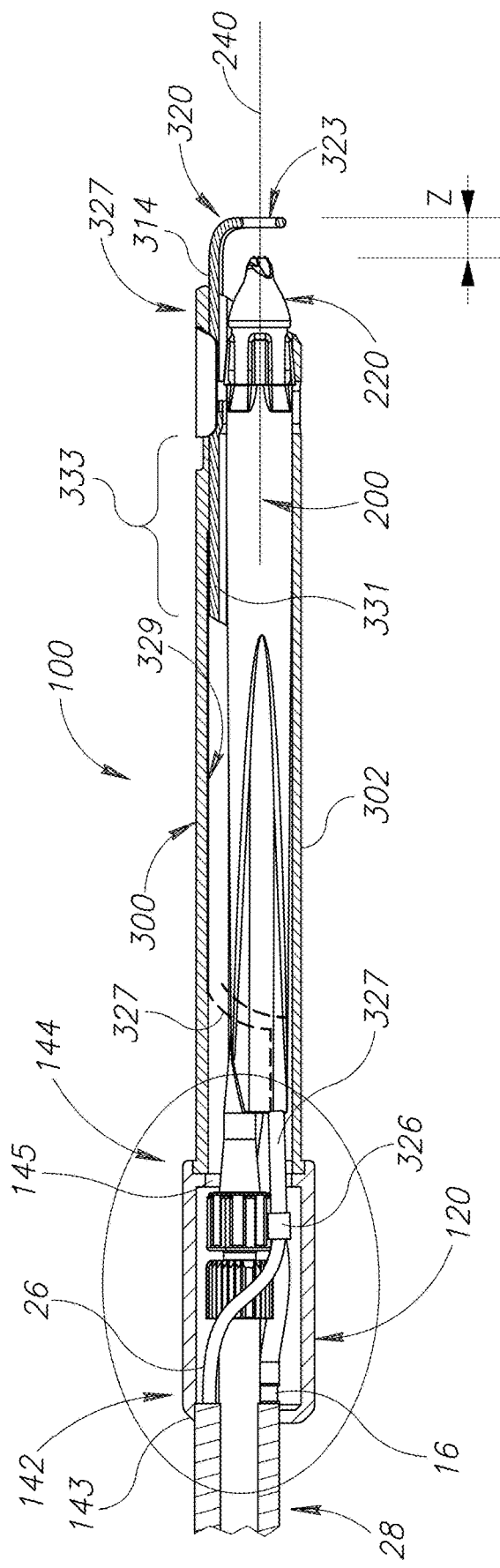
FIG. 4 is a cross-sectional elongate view of the handpiece.

As illustrated in FIG. 4 by way of schematic example only, conductor 327 may be embedded or otherwise formed within the wall of sheath 302, so as to have a distal end portion 329 which overlaps with and contacts a proximal portion 331 of end member 320 in an overlap region referenced generally 333.

As well known in the art, and referring again to FIG. 1B, the exposure of skin 110 to jet spray 242 is so as to provide a predefined therapy, for example, infusion. Jet spray 242 provides a focused jet having predefined qualities, such as pressure, flow rate, spray pattern, droplet size, droplet speed, impact on skin, reach, and the like, so as to facilitate to enable trans-epidermal infusion, as mentioned.

Jet spray 242 is composed of high speed, high pressure microdroplets which bombard and thus impact the skin. The microdroplets possess kinetic energy which effectively causes them to act as solids when impacting the skin, and depending on the angle that the handpiece is held relative to the skin, to have an infusive effect thereon, so as to infuse the therapeutic agent bearing liquid into the skin. When the jet spray handpiece 200 is held perpendicular or nearly perpendicular to the skin, as seen in the drawing, cavitation occurs, causing the formation of a recess or dimple 111 in the skin 110. This causes the skin in which recess 111 is formed to be stretched, causing the opening of micropores in the skin for infusion of the jet spray components, with gas and liquid vacuoles created in the skin tissue.

At the same time, operation of operative end member 320 of symbiotic treatment handpiece element 300 when held in touching contact with skin 110, exposes a portion 113 of the epidermis surrounding and underlying dimpled area 111, to an electrical charge, when element 300 is an electroporation handpiece and end element 320 is an electroporation probe. This improves the porosity of the epidermis, thus facilitating more effective penetration by the jet spray therapy.

An analogous effect is received, mutatis mutandis, when the symbiotic treatment handpiece element employs an ultrasound transducer 420, as described hereinbelow in conjunction with FIG. 9, wherein the energy to which dimpled area 111 is exposed is ultrasound radiation.

Figure 1C:
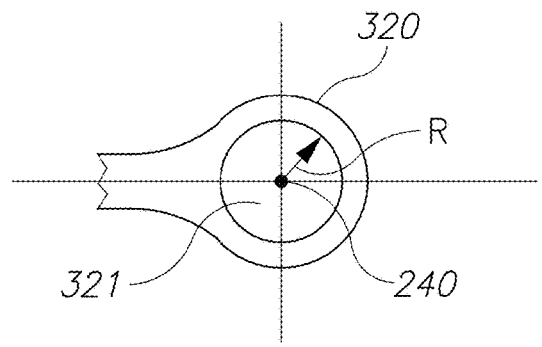
FIG. 1C is a schematic view top view illustration of the operative end member in the position depicted in FIG. 1B.
Figure 3B:
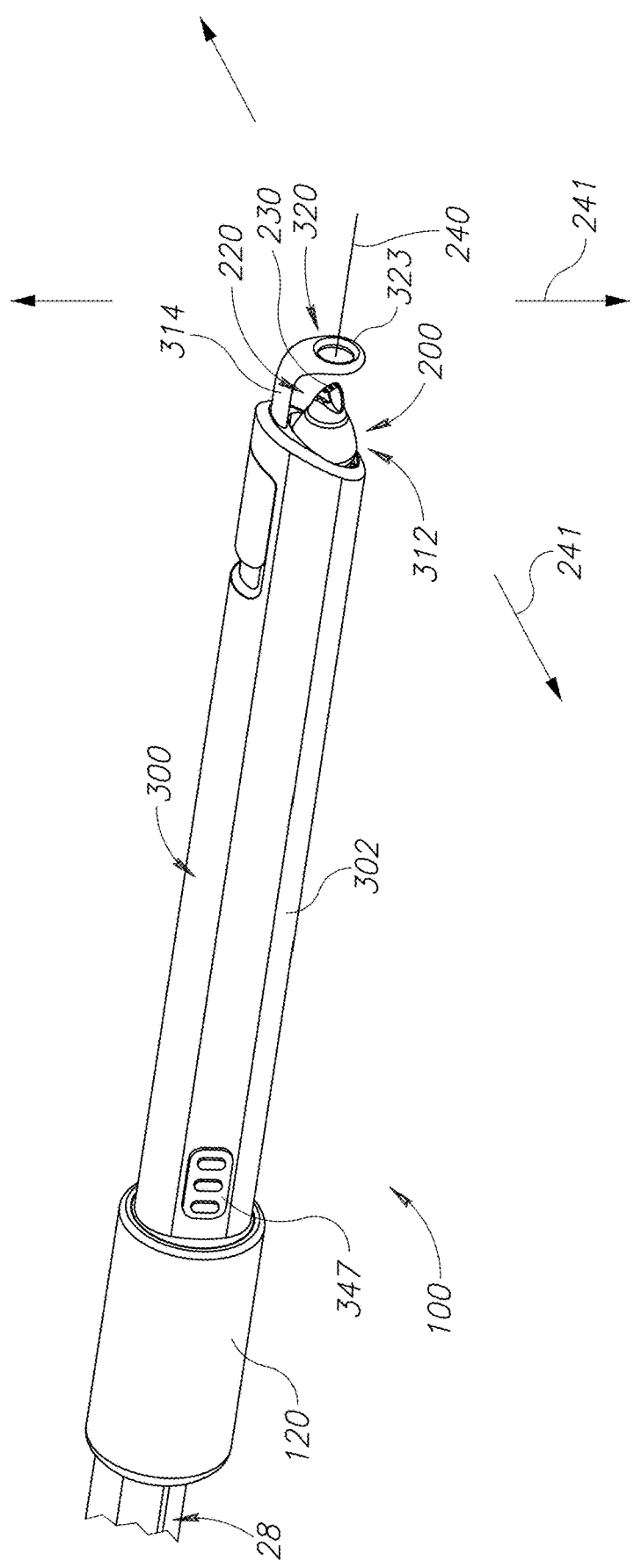

Referring now also to FIG. 1C, end member 320 extends distally from unitary handpiece 100 as described hereinbelow, and, is exemplified herein as having a ring-shaped, circular opening 321 of radius 'R'. Further as seen, end member 320 is typically mounted coaxially with nozzles 230, and normal thereto, and such that axis 240 passes through the geometric center of opening 321, as seen.

Probe 320 has a distal touch surface 323 that, when in use, is held in touching contact with the skin 110 of the subject (FIG. 1B) so as to extend beyond nozzles 230 by a dimension whose magnitude is equal to a preselected spray application distance 'z' therefrom. As known in the art, the distance from which the jet spray is directed to the skin 110 of the subject may vary from treatment to treatment, and even during different stages of a single treatment. In the prior art the handpiece is fully handheld by a user, and thus this distance is difficult to gauge; it is approximate, and difficult to maintain such that its consistency in a single treatment is dependent on the steadiness of hand of the person applying the treatment. In the present invention, however, distal touch surface 323 is held against skin 110, such that application distance 'z' is known in advance of a treatment. Furthermore, as will be appreciated from the description below of FIGS. 7A-12B, application distance 'z' is adjustable. In accordance with one embodiment, seen, for example, in FIG. 7A-7C, member 320 is slidably adjustable, whereas in the embodiment of FIGS. 8A-8B, a screw mechanism is provided. These are merely examples, and other means by which member 320 may be adjustably mounted are considered to be within the scope of the present disclosure.

Figure 7A:
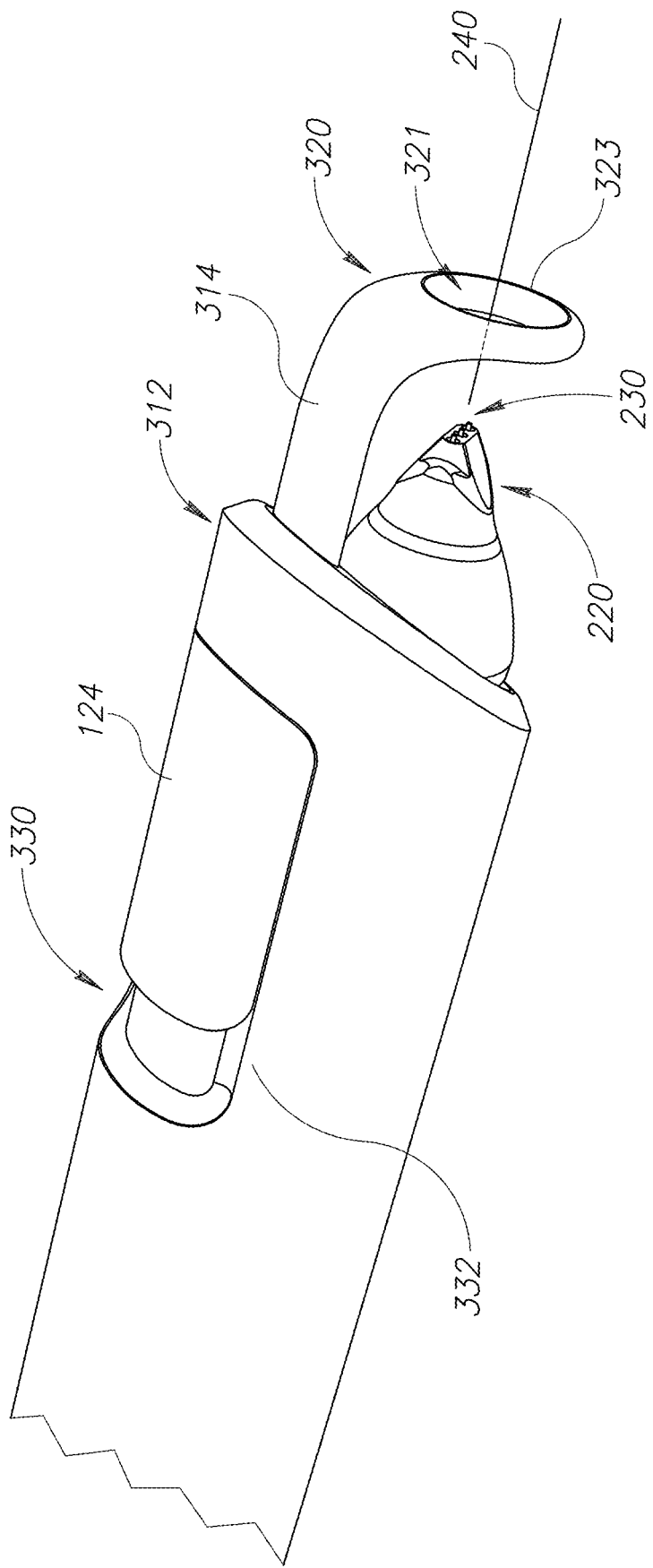
FIG. 7A is an enlarged view of the operative end of the above illustrated handpiece in accordance with one embodiment, wherein the probe is slidably adjustable with respect to the illustrated nozzles.
Figure 7B:
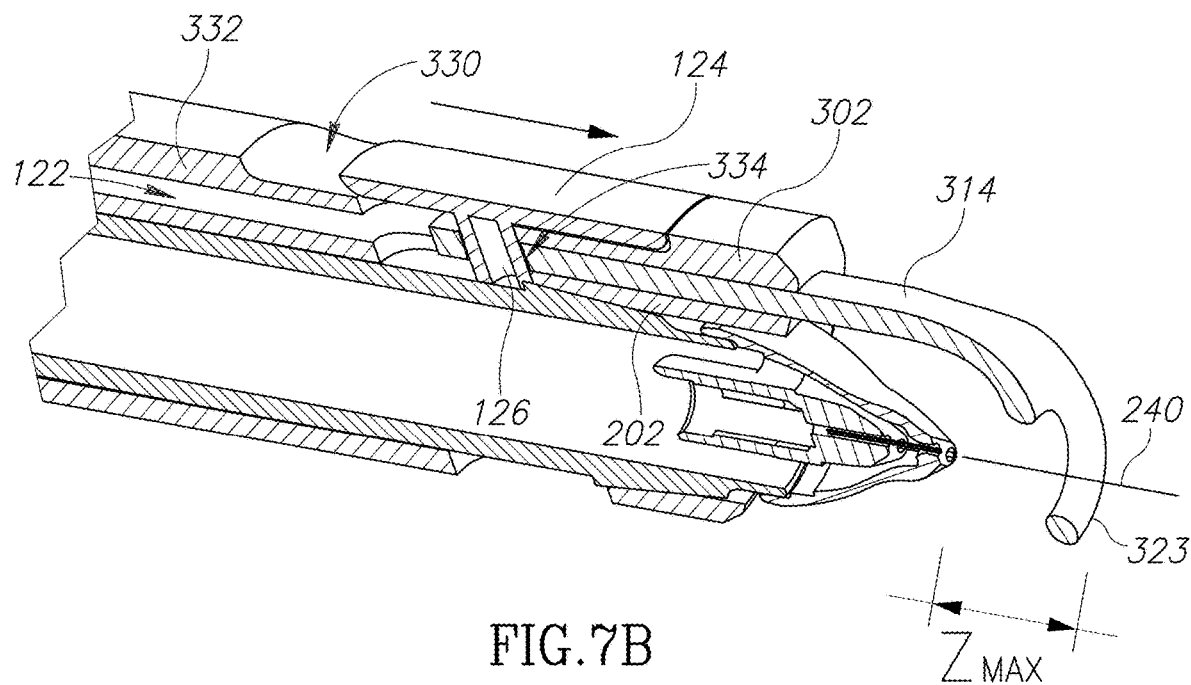
FIGS. 7B and 7C are cross-sectional views of FIG. 7A, wherein the probe is seen in extended and retracted positions, respectively, relative to the nozzles.
Figure 7C:
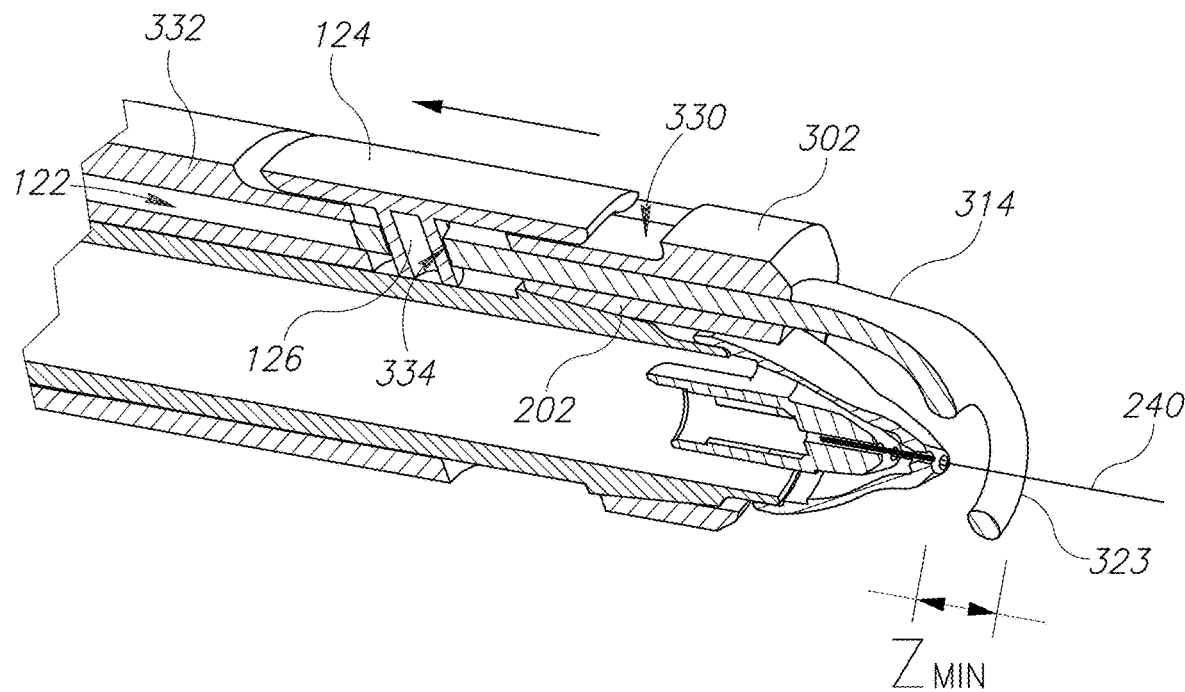

Accordingly, and as seen in the embodiment of FIGS. 7A-7C, in which symbiotic treatment element 300 is an electroporation element, support arm 314 of electroporation probe extends rearwardly through a channel 122 (FIGS. 7B and 7C) formed between spray jet housing 202 and sheath 302. A T-shaped slider element 124 is positioned within an elongate window 330 formed in the side wall 332 of sheath 302, typically parallel to axis 240. Slider element 124 has an inward, radially extending protrusion 126 extending through an opening 334 of support arm 314. It will thus be appreciated that the position of touch surface 323, and thus the magnitude of spray application distance 'z' may be adjusted by sliding of slider element 124 within window 330, wherein a maximum magnitude Zmax and a minimum magnitude Zmin are illustrated in FIGS. 7B and 7C, respectively.

Figure 8A:
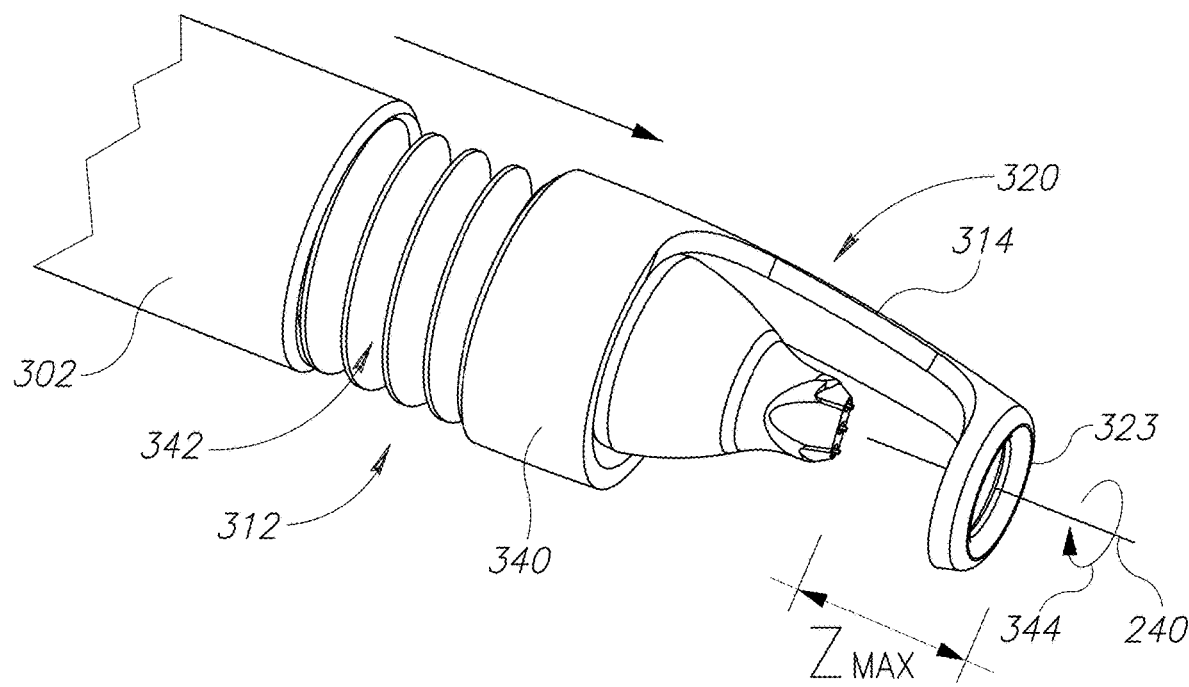
FIGS. 8A and 8B are enlarged views of the operative end of the above illustrated handpiece in extended and retracted positions, respectively, in accordance with a second embodiment, wherein the probe is adjustable with respect to the illustrated nozzles by means of a screw thread.
Figure 8B:
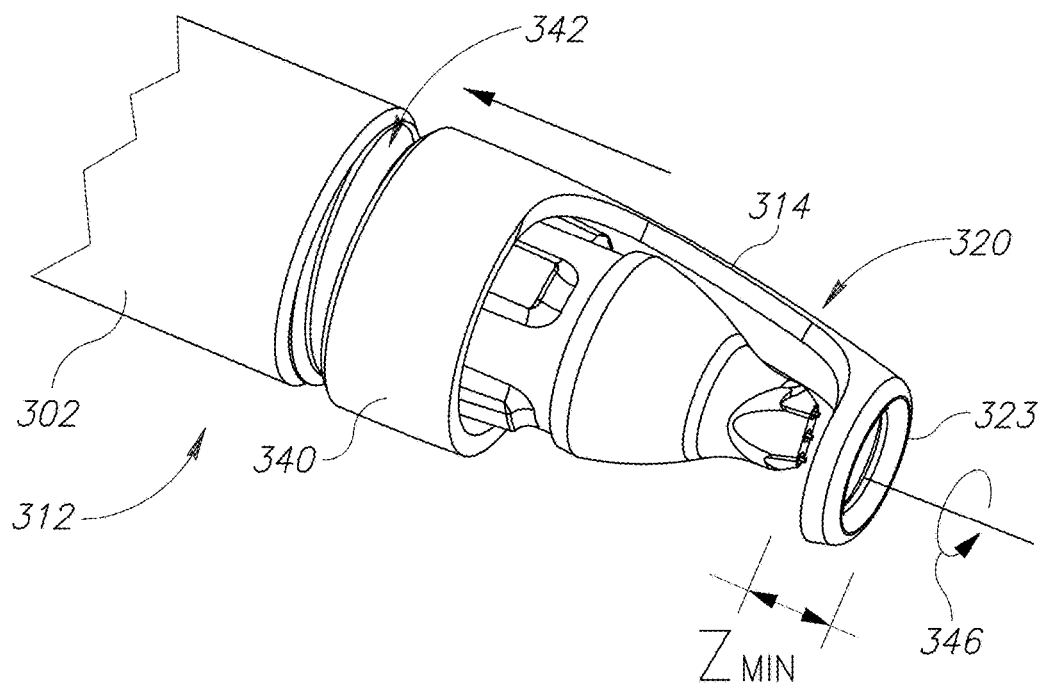

In the embodiment of FIGS. 8A-8B, operative end member 320, embodied herein by way of example, as electroporation probe 320, is screwably mounted onto distal end 312 of cylindrical sheath 302 by means of a proximal ring portion 340 having an internal screw thread (not seen) which cooperates with an external screw thread 342 formed on distal end 312 of sheath 302. As illustrated in FIG. 8A, probe 320 may be rotated in a first direction 344 along the screw thread 342 so as to increase the spray application distance 'z' until a maximum Zmax. Further, as illustrated in FIG. 8B, probe 320 may be rotated in a second direction 346, opposite to the first direction, along the screw thread 342 so as to decrease the spray application distance 'z' until a minimum Zmin.

It will be understood by persons skilled in the art that the adjustments mechanism illustrated in FIGS. 7A-8B are for example only, and that any suitable mechanism for achieving the same purpose, may be provided within the scope of the invention.

Referring now to FIG. 9, there is seen a unitary handpiece, referenced generally 400, in which the symbiotic treatment element is an ultrasound element. In other respects, handpiece 400 is generally similar to handpiece 100 as shown and described hereinabove in conjunction with FIGS. 1A-7C.

Portions of the illustrated device 400 that are shown and described above are depicted in the present drawing by similar reference numerals, device 400 being described only with regard to the differences when compared with handpiece 100.

In the present embodiment, the operative end member is exemplified as an ultrasound transducer 420, shown in FIG. 9 to be arc-shaped, exemplified herein a as a complete, circular ring. Thus, in a manner similar to that depicted in FIG. 1, transducer 420 and nozzles 230 are coaxially aligned, such that the jet spray 242 (FIG. 1B) impinges on the skin 110 of a subject at the center of an area 113 exposed to ultrasound waves, as shown and described above in conjunction with FIGS. 1B and 1C. The precise construction of an ultrasound transducer is well known in the art, and is thus beyond the scope of the present invention. A typical circular transducer may be that manufactured by PZT Electronic Ceramic Co., Ltd, of 15 Dezheng West Road, Changan Town, Dongguan City Guangdong Province China, selected from their list of products at https://www.piezoelements.com/piezo-ceramic/piezo-ring/.

In accordance with different embodiments, the shape of the operative end member need not be specifically circular. For example, as exemplified in FIG. 10, operative end member may be U-shaped, as shown by U-shaped transducer 420'. The spatial positioning of transducer 420' is generally similar to that shown and described above with reference to FIG. 1C, and is mounted such that its touch surface 423' surrounds axis 240 in a plane normal thereto.

Figure 11:
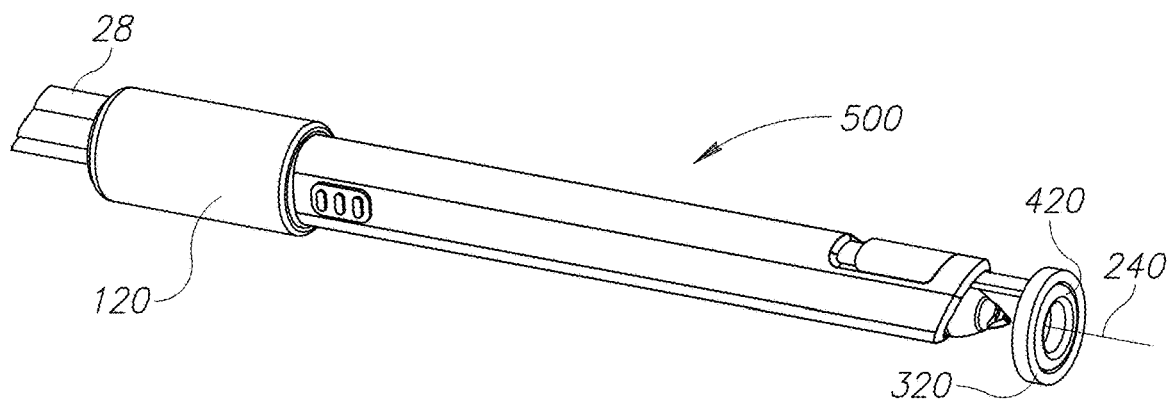
FIG. 11 is a perspective view of a unitary handpiece similar to that of FIGS. 1A-10, but wherein an electroporation probe and an ultrasound transducer are incorporated into a unitary operative end member.
Figure 12A:
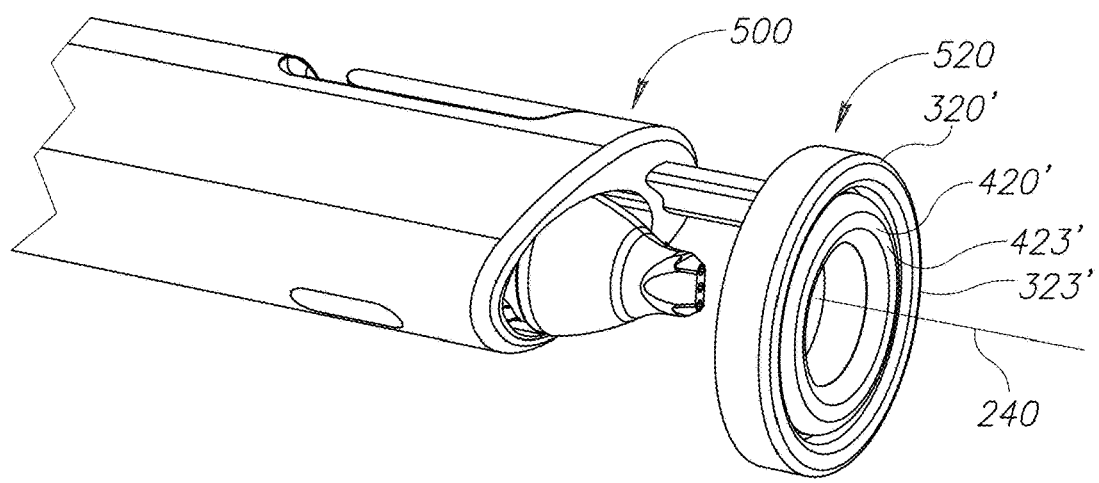
FIG. 12A is an enlarged view of the end portion of FIG. 11.
Figure 12B:
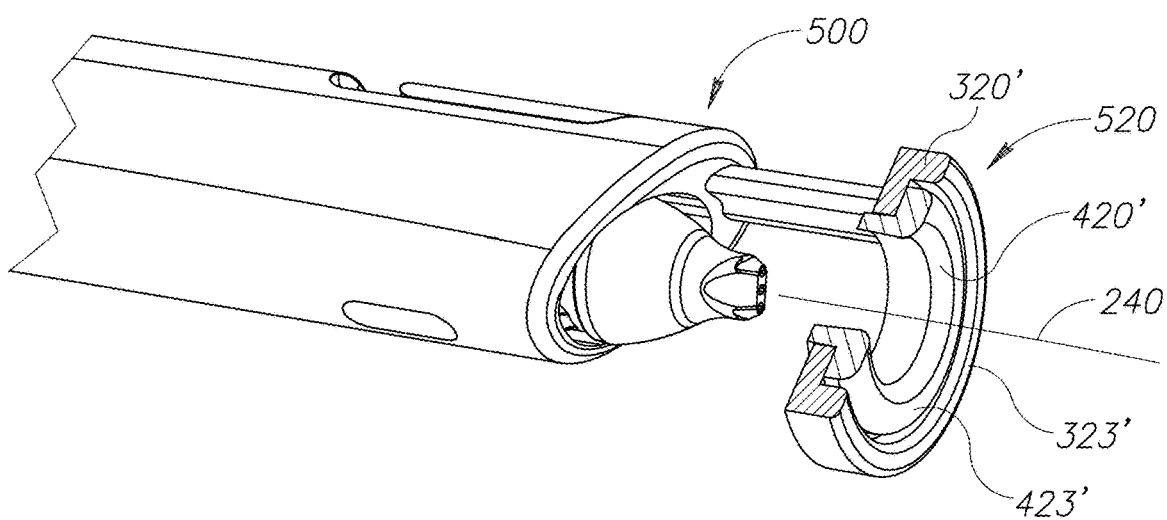
FIG. 12B is similar to FIG. 12A, but wherein the unitary operative end member is seen in cross-section.

Referring now to FIGS. 11-12B, there is seen a unitary handpiece 500 in which the exemplified symbiotic treatment element combines two end members implementing two different technologies. In the present example, symbiotic treatment element combines complementary dermal treatment member components referenced 320' and 420' formed as a combination end member 520. Outer member 320' is an electroporation probe, and inner member 420' is an ultrasound transducer.

Except as specifically described hereinbelow, handpiece 500 is generally similar to handpieces 100 and 400 as shown and described hereinabove in conjunction with FIGS. 1A-10. Portions of the illustrated device 400 that are shown and described above are depicted in the present drawing by similar reference numerals, device 500 being described only with regard to the differences when compared with handpieces 100 and 400.

As seen in the cross-sectional enlargement of combination end member 520, the two components are seen to be provided in the form of nested rings, thereby to ensure synchronization of movement when being adjusted, such that the distal touch surfaces thereof, respectively, 323' and 423' are coplanar.

Figure 13:
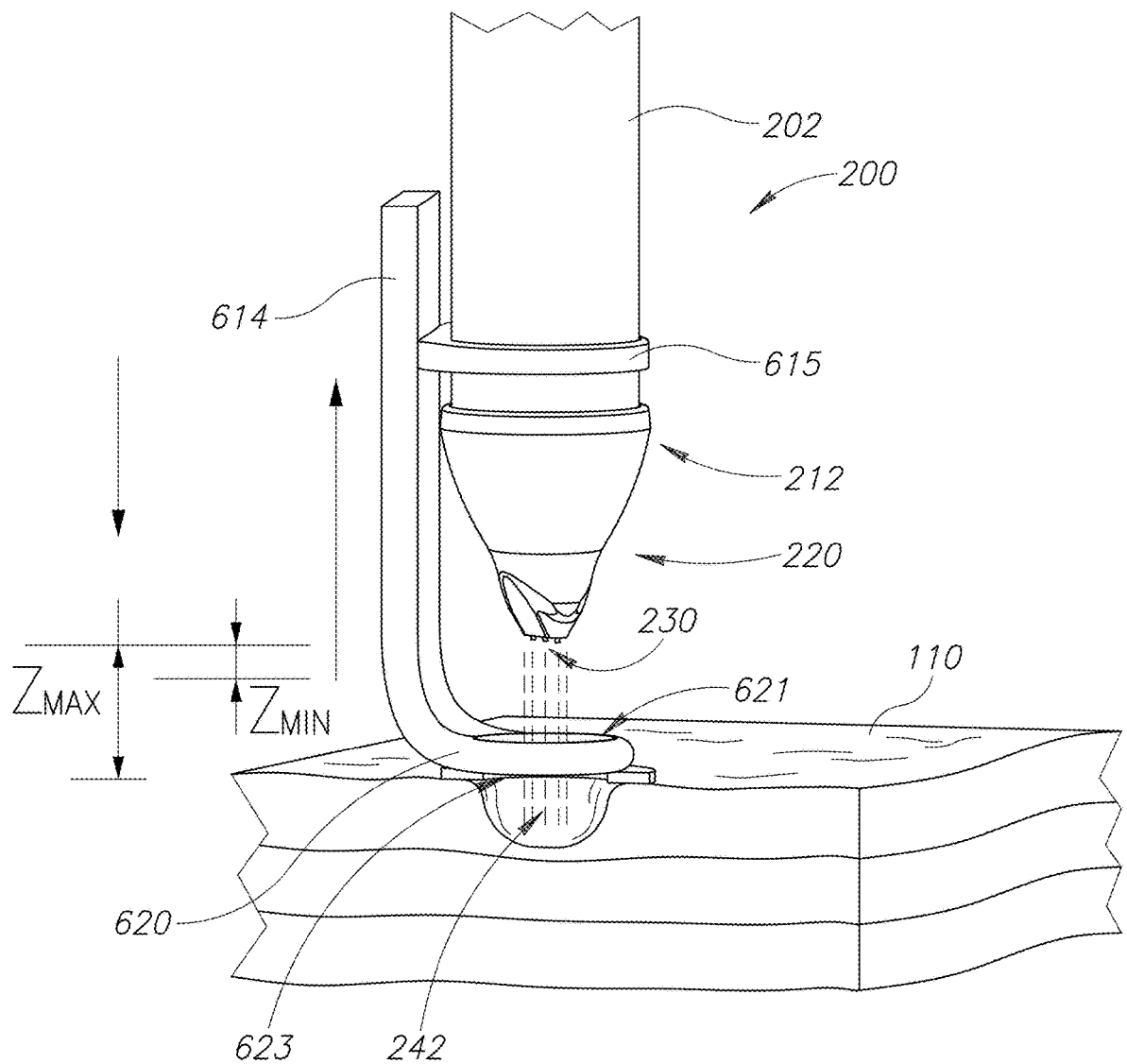
FIG. 13 is an enlarged schematic showing operation of a jet spray handpiece having mounted thereon a spacer probe for accurately controlling the spacing of the nozzles from the skin of a subject.

Reference is now made to FIG. 13, in which there is seen a rigid spacer element 620, formed of any suitable material, typically a rigid plastic, for accurately positioning the nozzles 230 of delivery head 220 of jet spray delivery handpiece 200 relative to the skin 110 of a subject.

Element 620 is mounted onto distal end 212 of handpiece 200 by means of a support arm 614 and an adjustable mount 615 operative to be slidable or otherwise adjustable along housing 202 of handpiece 200. In practice, adjustable mount may be replaced by any suitable sliding or screw thread attachment means, similar to those shown and described above in conjunction with FIGS. 7A-8B. Similar to probe 320, element 620 is exemplified herein as having a circular opening 621 thereby to facilitate passage therethrough of a jet spray 242. Element 620 has a touch portion 623 adapted to be placed against skin 110 of the subject. As seen, element 620 limits the range at which nozzles 230 can be positioned from skin 110 during treatment to no less than a spray application distance 'z', which varies from a minimum magnitude Zmin to a maximum magnitude Zmax. Typically, Zmin is approximately 5 mm and Zmax is 15 mm, although the actual ranges will be determined by the requirements of different treatments.

It will be appreciated by persons skilled in the art that the scope of the present invention is not limited by what had been shown and described hereinabove, merely by way of example. Rather, the scope of the invention is limited solely by the claims in which:

The invention claimed is:

1. A multi-technology dermal treatment unitary handpiece which includes:
   a unitary jet spray delivery handpiece comprising:
      an airtight elongated linear housing having an axis of symmetry, terminating in a delivery head having at least one therapeutic spray nozzle for directing along an axis a therapeutic spray towards the skin of a subject at a spray application distance therefrom, wherein said at least one therapeutic spray nozzle comprises:
         at least one gas discharge nozzle aligned with said axis of symmetry for receiving a flow of gas pressurized in the range 40-150 psi and for delivering the flow of gas into the atmosphere so as to result in a shock wave upon exiting said at least one gas discharge nozzle, said at least one gas discharge nozzle having an internal diameter; and
         at least one linear liquid discharge nozzle having a longitudinal axis, extending through said at least one gas discharge nozzle coaxially therewith, and having an external diameter whose magnitude is less than said internal diameter of said at least one gas discharge nozzle, said at least one linear liquid discharge nozzle having an opening for discharging a flow of therapeutic liquid into the pressurized flow of gas, thereby to expose the flow of therapeutic liquid to the shock wave so as to cause atomization of the liquid into microdroplets, the atomized liquid combining with the gas flow so as to result in a high velocity, focused, therapeutic jet spray of the microdroplets along an axis, the microdroplets having predefined qualities so as to facilitate trans-epidermal infusion thereof into the skin of the subject at a predetermined spray application distance therefrom; and
   a mechanism for positioning said operative end member and said touch surface beyond said at least one therapeutic spray nozzle by a spray application distance having a magnitude within a predetermined range, such that said operative end member is electrically operable when positioned at said spray application distance.

2. A handpiece according to claim 1, wherein said operative end member of said at least one symbiotic treatment handpiece element is adjustable with respect to said at least one therapeutic spray nozzle, thereby to correspondingly adjust said spray application distance within said predetermined range.

3. A handpiece according to claim 1, wherein said at least one symbiotic treatment handpiece element includes first and second symbiotic treatment handpiece elements.

4. A handpiece according to claim 3, wherein said first symbiotic treatment handpiece element is an electroporation element and said operative end member thereof is an electroporation probe, said second symbiotic treatment handpiece element is an ultrasound element and said operative end member thereof is an ultrasound transducer.

5. A handpiece according to claim 1, wherein said operative end member and said dermal touch surface are curved and are mounted so as to reside within a plane transverse to said spray axis.

6. A handpiece according to claim 5, wherein said dermal touch surface is arc-shaped with a center of curvature which intersects with said spray axis in a plane normal to said spray axis.

7. A handpiece according to claim 1, wherein said at least one symbiotic treatment handpiece element also includes:
- a cylindrical sheath having proximal and distal ends, configured to fit at least partially around said housing of said jet spray delivery handpiece such that said at least one therapeutic spray nozzle protrudes through said distal end of said cylindrical sheath; and
- a support for mounting said operative end member onto said distal end of said cylindrical sheath so as to position said touch surface from said at least one therapeutic spray nozzle at a distance equal to said predetermined spray application distance.

8. A handpiece according to claim 7, wherein said operative end member is powered by electricity, and said at least one symbiotic treatment handpiece element includes an electrical conduction element for supplying electricity from an electrical source to said operative end member.

9. A handpiece according to claim 8, wherein said jet spray delivery handpiece includes a liquid supply tube positioned within said housing for supplying a liquid suspension of a therapeutic agent, wherein said liquid supply tube terminates at a proximal end at a liquid connector to an external liquid source, said housing terminates at a proximal end at a gas connector to a pressurized gas source, and said electrical conduction element terminates at a proximal end at an electrical connector to an external source of electricity,
and wherein said handpiece also includes a hollow coupling connected to said proximal end of said cylindrical sheath, for housing said liquid, gas and electrical connectors.

10. A handpiece according to claim 9, wherein said hollow coupling and said cylindrical sheath are coupled together by clips.

11. A handpiece according to claim 1, wherein said at least one symbiotic treatment handpiece element is an electroporation element, and said operative end member is an electroporation probe.

12. A handpiece according to claim 1 wherein said at least one symbiotic treatment handpiece element is an ultrasound element, and said operative end member is an ultrasound transducer.

* * * * *